United States Patent [19]
Gillis et al.

[11] Patent Number: 5,959,801
[45] Date of Patent: Sep. 28, 1999

[54] STICTION REDUCTION IN DISK DRIVES USING HEATING

[75] Inventors: Donald Ray Gillis, San Jose; Mike Suk, Milpitas; Bond-Yen Ting, San Jose, all of Calif.

[73] Assignee: International Business Machines Corporation, Armonk, N.Y.

[21] Appl. No.: 08/956,255

[22] Filed: Oct. 22, 1997

[51] Int. Cl.⁶ .............................. G11B 21/02; G11B 5/56
[52] U.S. Cl. ............................................ 360/75; 360/109
[58] Field of Search ...................................... 360/109, 75

[56] References Cited

U.S. PATENT DOCUMENTS

| | | | |
|---|---|---|---|
| 4,605,979 | 8/1986 | Inoue et al. | 360/105 |
| 4,684,913 | 8/1987 | Yaeger | 337/140 |
| 5,023,737 | 6/1991 | Yaeger | 360/105 |
| 5,034,828 | 7/1991 | Ananth et al. | 360/103 X |
| 5,060,099 | 10/1991 | Yaeger et al. | 360/105 |
| 5,223,998 | 6/1993 | Tokuyama et al. | 360/103 |
| 5,523,898 | 6/1996 | Jove et al. | 360/66 |
| 5,815,347 | 9/1998 | Pattanaik | 360/104 |

FOREIGN PATENT DOCUMENTS 2-162584  6/1990  Japan .............................. G11B 21/21

*Primary Examiner*—John H. Wolff
*Attorney, Agent, or Firm*—G. Marlin Knight

[57] ABSTRACT

An arrangement for reducing the stiction bond at power-up time between an slider parked on a disk or other magnetic recording medium. A thermally expansive medium such as alumina is included in the slider body thermally adjacent to the write element. At power-up time or when a failure of the disk, etc. to rotate is detected during startup, a current is applied to the write element. The volume expansion resulting from the heat causes a change in the shape and/or location of the slider surface in contact with the disk and thereby breaks or reduces the slider/disk stiction bond.

19 Claims, 5 Drawing Sheets

STICTION REDUCTION IN DISK DRIVES USING HEATING

FIELD OF THE INVENTION

This invention relates to magnetic or optical storage devices (disk drives), and more particularly to the reduction of stiction between parked transducers and the media.

DESCRIPTION OF RELATED ART

A magnetic direct access storage device (DASD) or disk drive comprises at least one rotating disk covered with a magnetic coating which can store magnetic or electronic data, and an apparatus for reading data from and writing data to that disk. This is implemented by a "spindle motor" to rotate the disk or disks; at least one "read/write element" to read and write data to and from the disk or disks; an "actuator" to position the read/write element or heads radially over the disk or disks, either on a linear or rotary basis; and a "data channel" to transfer information between the read/write element or heads and an accessing source.

The actuator has "arms" extending like a comb toward the disk or disks. Attached to these arms is one end of one or more "load beams" or "suspensions". The latter are thin pieces of metal or other substrate extending further toward the disk or disks. The other end of each load beam or suspension holds a "slider", including the read/write head assembly above the disk. A wire or wires for the transmission of data to and from the read/write head assembly runs along each suspension or toad beam.

In some disk drives, data can be stored on both sides of each disk. The disk or disks are stacked horizontally over the spindle motor. In multiple disk units, the disks are parallel to one another with spaces between them. A read/write head assembly positioned over that side of the disk by its own actuator arm/load beam assembly services each disk surface. Data is organized on the disks in concentric circles called "tracks", which are subdivided into "sectors".

The actuator arm/load beam suspension combination moves each slider, including its read/write head assembly, either radially or by following an arcuate path across the disk at very high speed to the particular track or tracks to be accessed. Relatedly, the read/write heads ride on an "air bearing" in relative motion with respect to the disk. As areal recording density has increased, the "flying heights" between the heads and media are being reduced and are measured in terms of microinches or nanometers.

In the drives, the actuator arms are either fixed to or integral with the actuators so the arms and their attached load beam suspensions move all the sliders (read/write assemblies) simultaneously and parallel to one another as the actuator moves. As part of changing a disk drive from an operational to a nonoperational state, the slider and head, and arms and suspensions are "parked" over the disks such that the slider body including the heads is opposite to and in contact relation with a disk surface. In this specification, the terms "slider" and "transducer assembly" are used interchangeably and mean a structure including any read or write element or the like.

Both inductive and magnetoresistive (MR) heads are used in disk drives. A typical transducer assembly might include an inductive element optimized for writing and a magnetoresistive (MR) element tuned for reading. The combination of an inductive write element with the read element is often collectively called an MR head and is the preferred choice in high-density hard disk drive units.

For purposes of this invention, the term "stiction" denotes a force of adhesion between objects of dissimilar materials. There can be various causes of stiction including lubricant problems, as well as, molecular attraction. Stiction, at least to some degree, typically occurs when a slider is parked a disk when the disk is not spinning. When the disk spins up, "stiction" acts as a mechanical resistance to torque from the drive motor applied to the disk.

In small high-density disk drives, the small size of the drive motor limits the amount of torque that can be easily developed at disk drive power-up time. Stiction adds to the force required to start the disk rotation. Once started, the disk may be brought up to rotate at a constant angular velocity with the slider flying over the disk surface.

One prior art mode of reducing stiction is to roughen at least part of the surfaces of the disks. This reduces stiction as the amount of smooth contact area is reduced. However, roughening the surface of the data area increases the mechanical asperities and alters the magnetic disk properties. Because the flying height between the head and the disk surface is so close in terms of a few microinches, increases in asperities will eventually crash the head and disk. The use of laser formed bumps to form a contact-start-stop area where the slider can land, park and takeoff is known. Lubricants are typically used on the disk surface and in some cases the lubricants can become part of the stiction problem as particle attractors and stiction enhancers in their own right.

Another approach is to electromechanically flex the suspension/slider away from the disk at start up. This is taught in Yaeger, U.S. Pat. No. 4,684,913, "Slider Lifter", issued Aug. 4, 1987; Yaeger et al., U.S. Pat. No. 5,060,099, "Disk Drive Slider Lifter Using Shape Memory Metals", issued Oct. 22, 1991; and Inoue et al., U.S. Pat. No. 4,605,979, "Load/Unload Suspension Device for a Magnetic Disc Apparatus", issued Aug. 12, 1986.

In the '913 patent, Yaeger discloses the use of a arrangement comprising metallic members, of which at least one member (24, 124, 224, 324) is remanent and volume deformable when a polarized current is passed through a closed circuit formed by the members (20, 24, 16, 30) and a voltage source (31, 32). This arrangement is placed very close to the flexible arm/suspension member (14). Ordinarily, an arm/suspension (14) is elastically deformable and normally biased to place the slider (18) in contact (as shown in FIG. 8 thereof) with the disk surface (34). When the circuit is closed at power-up time, the load beam arrangement volume expands in one of its martensitic/austenitic states, thereby flexing the slider suspension/slider (read/write head) away (FIG. 9) from the counterpart disk. In another arrangement, when the circuit is open (FIG. 3) at power-up time, the arrangement volume contracts, forcing the suspension/slider to disengage from the disk surface.

In the '099 patent, Yaeger discloses a variant of the '913 arrangement in which a current activated volume deformable wire (40) is transversely placed at a flexure point along the longitudinal extent of the suspension (30). When powered down, the slider and suspension are biased against the disk surface. When the drive is powered up, a portion of the current passes through the lift wire degrading into heat. This results in a bulk change and flexing of the suspension and slider away from the disk surface.

In the '979 patent, Inoue shows still another variant of flexing the suspension member by affixing a current activated and thermally deformable volume (11) to a disk drive arm and using various lever arrangements (7–10) to engage at least one suspension (5) at a point of flexure to move an attached slider (1) away from a disk. This publication also discloses combinations with springs and lever arrangements to move pairs of suspension members.

Typical disk drives have one or microprocessors which execute programs to control the complicated sequence of operations required to spin up the disk, precisely position the heads over the tracks and read and write date. At least a basic portion of the control programs (firmware) are stored in ROMs, but once the basic operations have been established, additional code may be downloaded from a host or read from the disk. The control program includes various error handling routines which can be invoked to handle particular problems. One of these problems is the failure of the disk to spin up when the spindle motor torque is applied. A typical startup sequence for a disk drive involves applying pulses to the coils of the spindle motor and then detecting whether the disk is rotating using any of various well known techniques such as back EMF sensing. If the disk is not rotating, there can, of course, be numerous causes, but one of these can be that one or more of the sliders are sticking to the disk. If the disk rotates as expected, then no special stiction breaking or other error recovery techniques are needed. The error recovery routines, which are typically implemented in the firmware in the drive, are invoked when the disk does not spin up and may use several techniques for attempting to break stiction. For example, it is known to exert various forces on the actuator by using the VCM to push the actuator (and transducer assembly) unidirectionally across the disk surface, as well as, to oscillate the actuator by rapidly switching between pulling and pushing actions of the VCM. Likewise the spindle motor may be used to exert unidirectional torque (typically pulsed), as well as, to oscillate the spindle motor at various frequencies. The spindle motor oscillation technique attempts to use the mechanical resonances of the system in its "stuck" state to in effect amplify the torque. The exact resonance of the system will not be known and will vary according to the number of sliders which are sticking among other factors. The dominant resonant frequency will increase with the number of sliders stuck as will the torque required to break the stiction. Therefore, the control program in the firmware will typically start the spindle motor oscillation near the low end of the possible resonance range at a low amplitude. If the first attempt does not free up the disk, then a higher frequency and/or higher amplitude will be tried and so forth. In general the control program will typically try to spin up the disk numerous time interlacing its attempts with various sequences and combinations of stiction breaking procedures. The program might spend several minutes in this process before giving up and reporting failure to the host system.

SUMMARY OF THE INVENTION

It is an object of this invention to devise an arrangement in which stiction is reduced between a transducer assembly parked on a recording medium when a power-up torque is applied to the medium by the device.

It is yet another object of this invention that such a stiction reduction arrangement be integral with the transducer assembly.

It is still another object that the arrangement preferably requires no additional parts such as separate electromechanical structures engaging flexure members coupling the assembly to the disk drive actuator or arm.

The above objects are believed to be satisfied by use of a slider design which uses heat to temporarily alter the geometry of the slider surface in contact with the disk. The volume expansion resulting from the heat causes a change in the shape and/or location of the slider surface in contact with the disk and thereby breaks or reduces the slider/disk stiction bond. Conventionally, the transducer assembly is biased toward the surface of the medium by a flexible load beam suspension affixed to the actuator arm. A typical transducer assembly is formed from an MR head and includes a source of current, a shielded MR read element, and an inductive write element (or head).

At least a portion of the slider comprises a material which expands with increasing temperature. A current is applied to an element which will generate heat. The write element is preferably used as the heating element, since a current source for the write element is already available in the typical drive and no additional components in the transducer assembly are needed. The heating of the element can be performed each time the device is powered on or spins up, but is preferably done only when a stiction problem is suspected, i.e., only when the disk fails to spin up normally in response to the spindle motor. The transfer of heat from the write element to the slider body results in expansion of material in the slider altering the shape and location of the contact area between the disk and the slider. The expansive material preferably forms the trailing end of the slider body and is in contact with the medium in at least the expanded state.

Using a typical write element and slider, the expansion of the slider in the direction perpendicular to the disk surface can fall in the range between 0–30 nanometers, responsive to a write current lying within the range between 25–70 milliamperes. The invention can be implemented with a transducer assembly comprising a magnetoresistive (MR) head, including an inductive write element and a typical write driver current source.

DESCRIPTION OF THE PREFERRED EMBODIMENT

Figure 1:
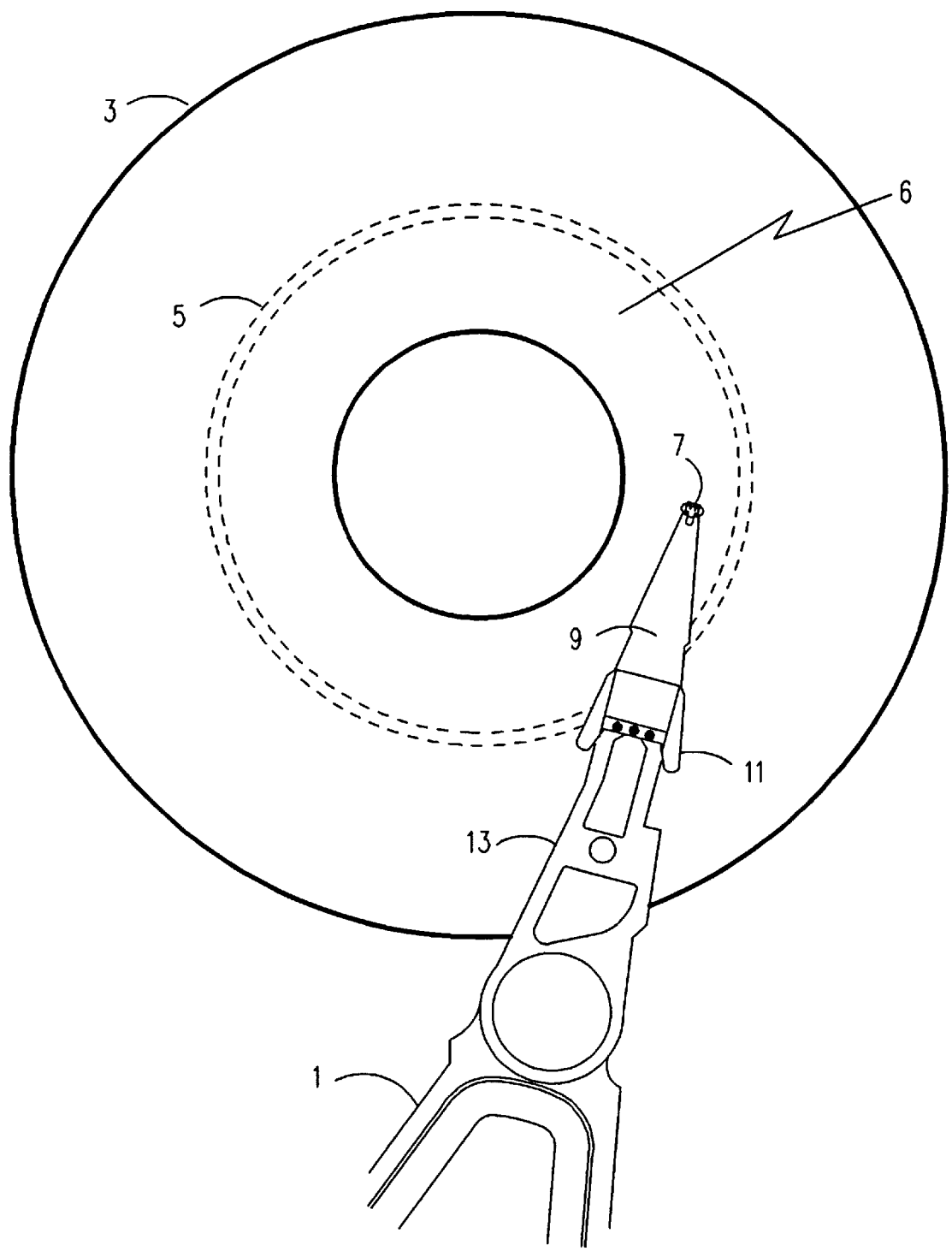
FIG. 1 shows a plan view of a head suspension assembly and a disk parked on a portion of a magnetic disk.

Referring now to FIG. 1, there is shown a plan view of a head suspension assembly 1 and a disk 3 with a predetermined data track 5. The assembly 1 includes an arm 13 coupled to a voice coil motor (not shown). A read/write head 7 is at the narrow end of a flexible, triangularly shaped suspension 9. The wide end of the suspension is secured to arm 13 by way of a rigid mount plate 11. The assembly 1 is further depicted in the "parked" position 6 on the disk 3. The parked position 6 is a default or rest position which is typically textured by laser melting or other means. Even when a disk drive is in such a powered-down state, it is subject to vibration and shock, so typically the parking area has no data recorded on it.

Figure 2:
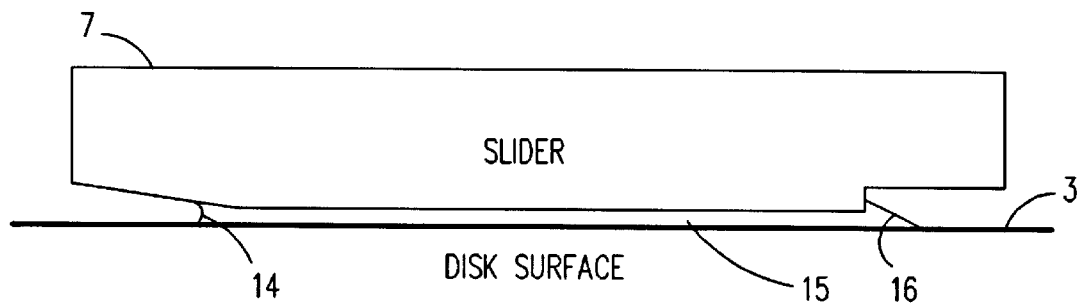
FIG. 2 sets out the contact relationship between the slider, head, and disk in the prior art.

Referring now to FIG. 2, there is shown a side view of the contact relationship between a slider including a head and a disk as found in the prior art. Sliders are currently typically two or three rail designs. Thus, viewed from the front the underside of the slider is not flat, but rather has rails on which the slider can rest against the media surface. At this point, it should be appreciated that "stiction" is a force of adhesion between the sliders and the disk surfaces which impedes the rotation of the disk when torque is applied to disk 3 through the spindle motor and spindle (not shown). Contemporary drives are packaged into a very small form factor and, therefore, use very small spindle motors having high rotational speed, but low startup torque. Thus, excess stiction can render the drive inoperable. The present invention can be used in addition to other prior art techniques for breaking stiction (as described above), either serially or simultaneously. For example, the heating current could be applied to the write element before, during or after oscillation of the VCM or pulsing the spindle motor as described above. The technique of the invention is complimentary to the other techniques and should preferably be used in combination with other methods in the overall stiction breaking procedure. The altered geometry induced by the heating of the slider rapidly returns to its original state when the current is removed.

In FIG. 2, a side view of the body of a typical transducer assembly or slider 7 is shown at rest on disk surface 3 via a contact area 15. The stiction acts over the surface or contact area. The contact area as shown is bounded by 14 and 16. The prior art solution, as used by Yaeger and Inoue with reference to the high-density, air-bearing drives, was to apply a current to cause at least one member of a lever arrangement to thermally alter one or more dimensions and apply a force normal to the disk on the suspension member. Such arrangements require additional components and take up space within a drive volume. Also, such arrangements must be "tuned" to deliver the force to the flexing suspension member at just the right point.

Figure 3:
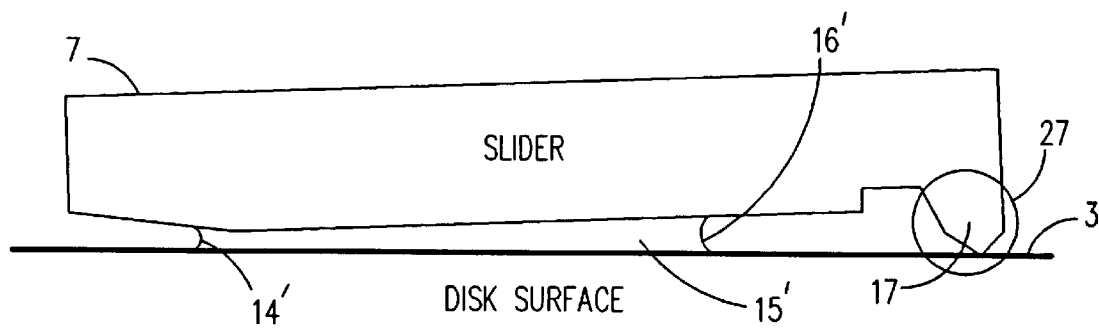
FIG. 3 illustrates the contact relationship between the slider, head, and disk with current actuated thermal volumetric enlargement of the head according to the invention.

Referring now to FIG. 3, there is illustrated the contact relationship between the body of the transducer assembly or slider 7, including the section of the slider containing the MR head 27 and disk 3 with thermally enlarged portion 17 according to the invention. It was observed that a current applied to the inductive write portion of an MR head would result in a thermal heat transfer from the write element to the alumina, and induce a thermal expansion which would include the trailing edge of the alumina slider body. For the typical slider design illustrated, this results in a volumetric expansion and a projection 17 contacting the disk surface 3. Since the point of contact for projection 17 is spaced apart from the contact area 15', it exercises a leverage force multiplied over that distance to tilt or rotate the slider from a default position to second postion and tends to reduce the stiction bonding at the contact area 15'. The new contact area is a smaller area than that shown in FIG. 2. This smaller area is bounded by 14' and 16'. Although it is preferable to reduce the contact area, but since stiction may increase with the contact time between the two surfaces, the stiction may be reduced by shifting the contact area even if the new area is larger than the orignal contact area. The tilting/rotating movement may also break any sort of brittle stiction bonds that have been formed.

Figure 4:
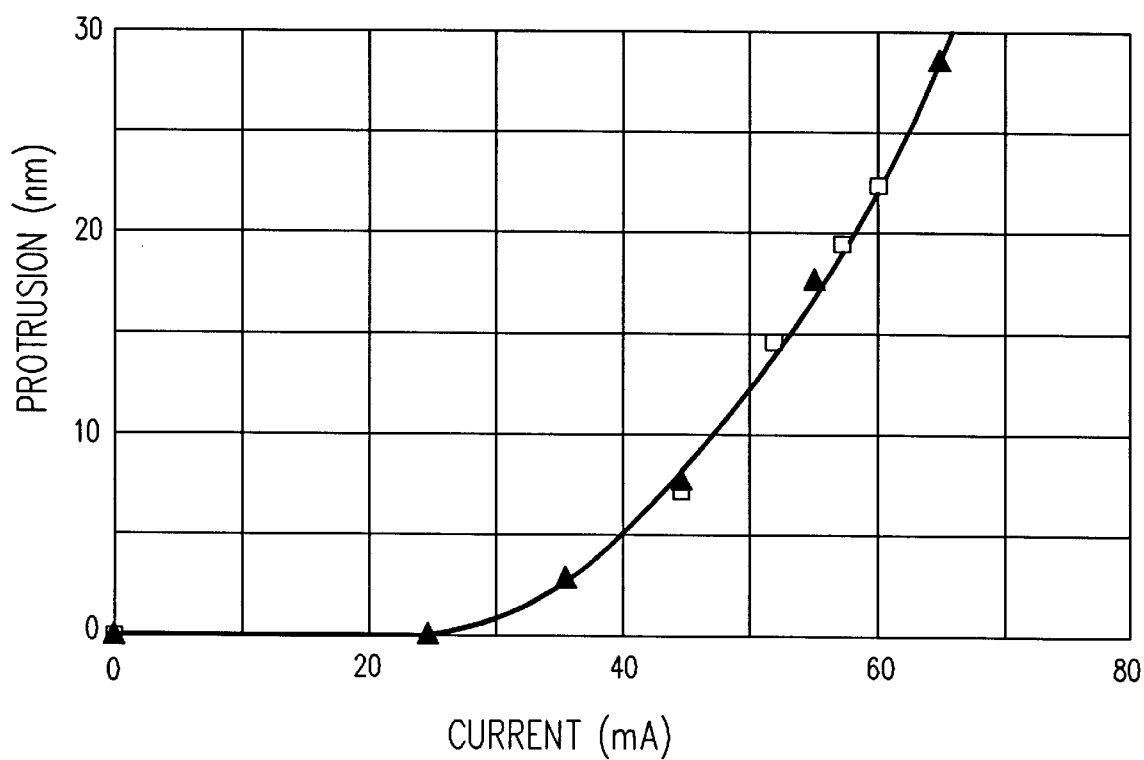
FIG. 4 shows a protrusion vector dimension for the slider at the trailing edge of the slider as a function of write current.

Referring now to FIG. 4, there is shown a protrusion dimension (one direction) of the trailing edge as a function of write current. Since the write element is preferably sited at the trailing edge of the transducer/slider body, it normally does not exert any pressure on the disk surface 3 when the drive is powered off. A thermal expansion vector sufficient to exercise a leveraging force need only be in a range of tens of nanometers. In this regard, it was also observed that alumina in the proximity of the inductive write element expands from heat due to the write current ($I^2R$ loss) in the tens of milliamperes range. FIG. 4 depicts an perpendicular expansion vector of alumina for a typical slider in the range between 0–30 nanometers responsive to a write current lying within the range between 25–70 milliamperes. The length of time needed to generate the required amount of heat is on the order of 100 milliseconds.

Figure 5A:
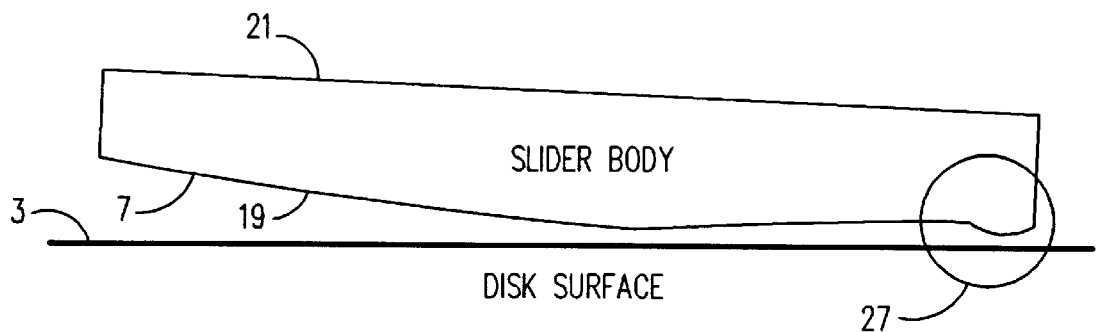
FIGS. 5A–5B depict an enlarged view of the contact relations between the trailing edge of the slider body and MR head according to the invention.
Figure 5B:
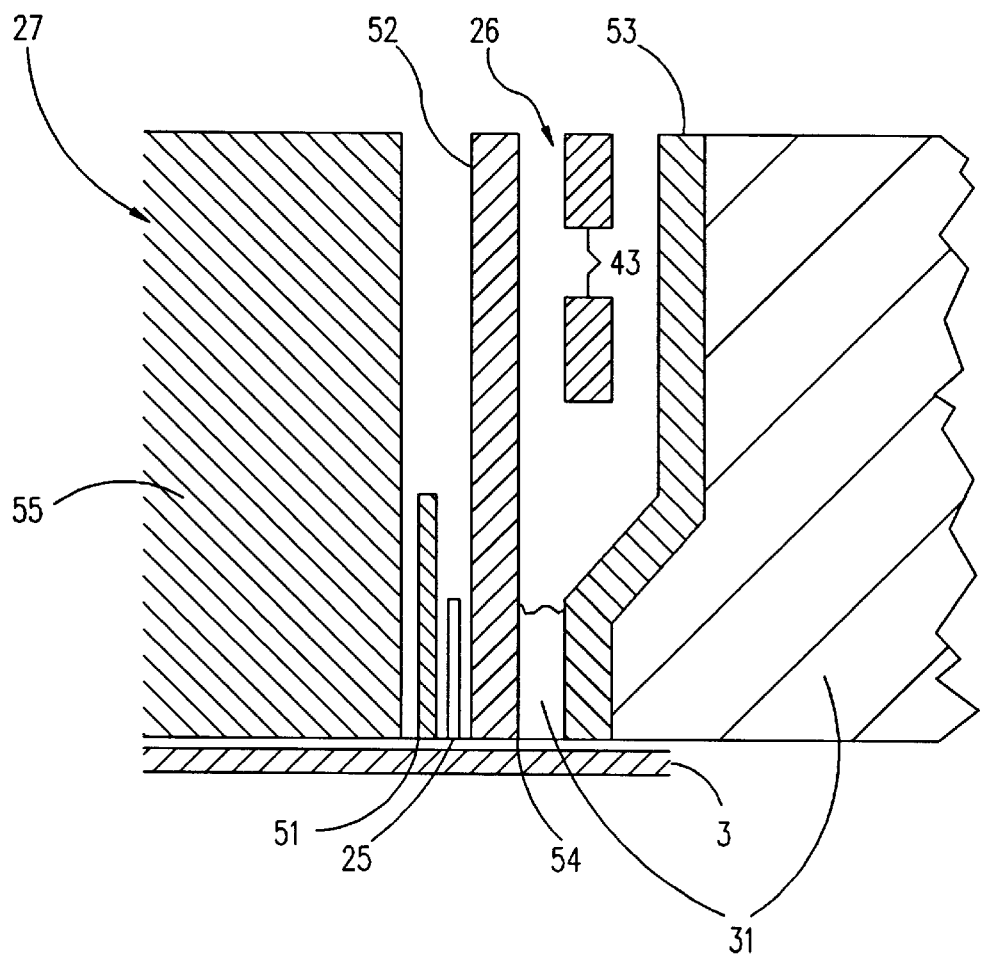

FIG. 5A depicts an enlarged view of the section of the slider containing the MR head 27 showing the relations between the trailing edge of the slider body 21 and the MR head with the disk surface 3 according to the invention. The underside or crown 19 of the transducer body or slider 7 constitutes an aerodynamic or air-bearing surface once the stiction has been overcome and the disk is rotating at speed. When the slider is parked, it rests on in contact with the disk surface 3. As noted the parking zone may be textured with laser bumps and the slider will typically have rails which will contact the disk. A conventional MR head is positioned at the trailing edge of the slider assembly. There are, of course, many variations of inductive heads and MR heads, but the invention described herein is general in nature and may be used with a wide variety of head designs. As an illustration an MR head as described in U.S. Pat. No. 5,523,898 is shown in cross-section in FIG. 5B. The head comprises a substrate 55, an MR element 25 used for reading and one or more magnetic shields 51. The inductive write element 43 is typically a coil of copper wire with pole pieces 52, 53 on either side. Each pole piece has a pole tip, e.g., the pole tip 54 on pole piece 53. Part of the head is composed of alumina 31 which includes the area between the pole tips (the gap) and a large area behind the pole piece 53. A current is passed through the inductive write element to write the magnetic transitions on the disk 3 during normal operation. When used according to the invention, a current is supplied to the inductive write element 43 to produce heat. The inductive write element 43 is surrounded by insulating material 26 which conducts heat to the alumina 31. The thermal expansion of the alumina results in the protrusion or projection 17 contacting the disk surface to provide the force to break or reduce the stiction bond.

Figure 6:
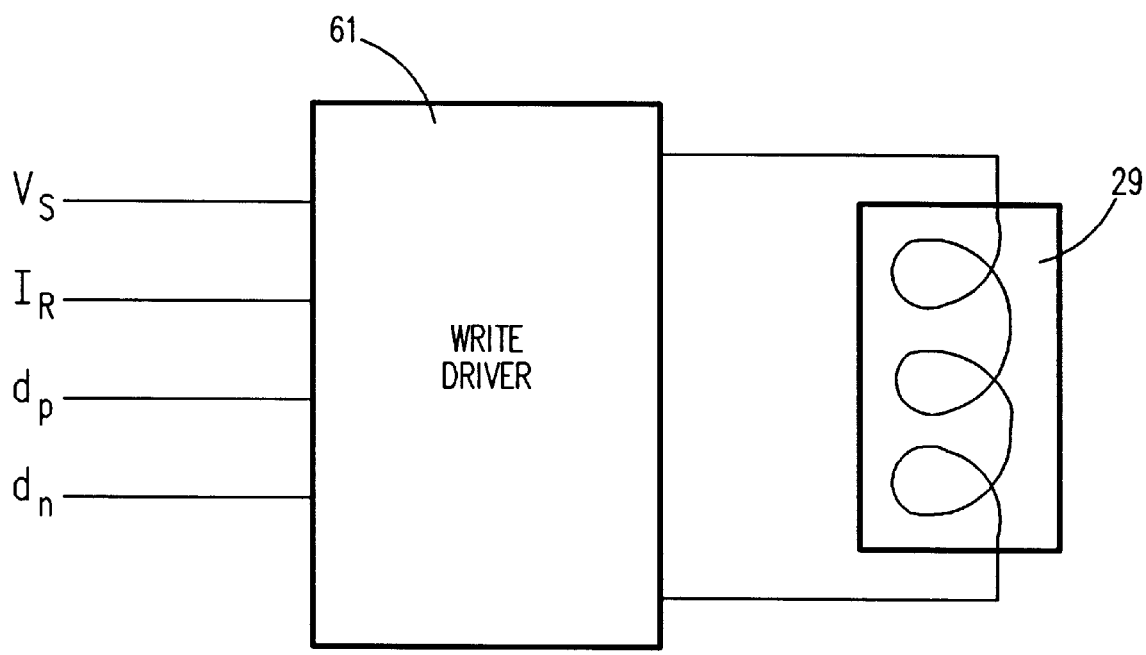
FIG. 6 illustrates a write driver circuit for an an inductive write element.

The current used to heat the inductive write element may be DC or pulsed. Although the invention can be used with any arrangement which supplies current to the write element, a typical write driver for an inductive write element which could be used with the invention is illustrated in FIG. 6. The write element 29 has its two electrical leads connected to the write driver 61 which can drive current through the write element in either direction. The write driver has both a current source $I_R$ and a voltage source $V_S$. The relative voltage across the write element is controlled by digital signals applied to inputs $d_n$, $d_p$. The relative voltage may be zero or it may be held at a plus or minus DC level or it may be rapidly switched to form pulses. The digital input signals are processed through the portion of the drive's electronics called the channel (not shown) and can be controlled by the standard microprocessor outputs. Given this type of hardware configuration, the invention may be implemented in the drive's firmware which is in any case intimately involved in the spin up process and error recovery procedures. Since the heating process is slower than electrical signals, the firmware will probably need to delay before trying to rotate the disk again to allow time for the expansion to occur after the current is applied.

If a separate heating element in the transducer assembly is used in place of the write element, then an appropriate current source for the heating element and means to control the current source must be present.

It is well recognized that stiction also may be present in a variety of heads parked on a recording medium when the storage device is powered down. Examples include magnetic tape or various forms of optical storage. The invention could be used in any of these devices where either mechanical action from thermal expansion or from the heat aids in breaking stiction.

While the invention has been described with respect to illustrative embodiments thereof, it will be understood that various changes may be made in the method and means herein described without departing from the scope and teaching of the invention. Accordingly, the described embodiments are considered exemplary and the invention is not to be limited except as specified in the attached claims.

What is claimed is:

1. A storage device comprising:
    a recording medium having a surface;
    a spindle motor for rotating the recording medium;
    a transducer assembly in a first position in physical contact with the surface of the recording medium, the transducer assembly including a heating element and a thermally expansive material in thermal contact with the heating element; and
    a switchable current source electrically connected to the heating element which optionally supplies current to the heating element to generate heat causing the thermally expansive material to expand and move the transducer assembly from the first position to a second position in relation to the surface of the recording medium when the recording medium is not rotating.

2. The storage device of claim 1 wherein the heating element is a coil of conductive material which is used as a write element when the disk is rotating.

3. The storage device according to claim 2, wherein the transducer assembly comprises a magnetoresistive (MR) head including an inductive write element and thermally expansive material adjacent to a pole piece.

4. The storage device of claim 1 wherein the thermally expansive material comprises alumina.

5. The storage device of claim 1 wherein the thermally expansive material is located at a trailing end of the transducer assembly.

6. The storage device of claim 1 wherein the thermally expansive material when expanding forms a projection which pushes against the surface of the recording medium causing the transducer assembly to move from the first position to the second position.

7. The storage device of claim 1 further comprising:
    a motor for moving the magnetic recording medium;
    means for detecting whether the magnetic recording medium is moving; and
    a control program executing on a microprocessor which activates the switchable current source after detecting failure of the magnetic recording medium to move in response to the motor.

8. The storage device of claim 1 wherein the first position has a first contact area with the surface and the second position has a second contact area with the surface and the second contact area is smaller than the first contact area.

9. The storage device according to claim 1, wherein the transducer assembly further includes a magnetoresistive (MR) read element and an inductive write element.

10. The storage device according to claim 1, wherein in a vector component of expansion, when heated, measured toward the disk surface is between 1 to 30 nanometers.

11. The storage device according to claim 1, wherein in the current is between 25 and 70 milliamperes.

12. A method of operating a storage device comprising the steps of:
    passing a current through an element in a transducer assembly which is in a first position in stationary contact with a surface of a recording medium, causing a thermal expansion of material in the transducer assembly, the thermal expansion causing the transducer assembly to shift to a second position in contact with the surface of the recording medium; and
    moving the recording medium or the transducer assembly by action of a motor.

13. The method of claim 12 wherein the element in the transducer assembly is a write element.

14. The method of claim 12 further comprising the steps of
    detecting that the recording medium is not moving in response to the motor and in response oscillating the transducer assembly using a voice coil motor (VCM) by rapidly switching between pulling and pushing actions of the VCM.

15. The method of claim 12 wherein the recording medium is a disk and the method further comprises the step of oscillating the disk using a spindle motor.

16. The method of claim 12 wherein the recording medium is a disk and the method further comprises the steps of:
    oscillating the disk using a spindle motor at a first frequency;
    attempting to spin up the disk;
    checking for disk rotation; and
    oscillating the disk using the spindle motor at a second frequency.

17. A disk storage device comprising:
    a spindle;
    a spindle motor for rotating the spindle
    a disk mounted on the spindle, the disk having a surface;
    an actuator positionable over the surface by a voice coil motor;
    a slider attached to the actuator, the slider being urged against the surface in a first position and in contact with the surface when the disk is not rotating;
    material in the slider which expands when heated, the material being positioned so that a vector component of the expansion will extend toward the surface of the recording medium; and
    a write element in a portion of the slider in thermal contact with the material in the slider which expands when heated;
    a write driver electrically connected to the write element to supply current to the write element when activated;
    a microprocessor; and
    firmware for the microprocessor which activates the write driver to supply current to the write element when failure of the disk to rotate in response to the spindle motor is detected, and retries to rotate the disk after delaying to allow the material to expand against the disk surface to move the slider to a second position.

18. The disk storage device according to claim 17, wherein the material is alumina located adjacent to a pole piece in the slider.

19. The disk storage device according to claim 17, wherein the current is between 25 and 70 milliamperes.

* * * * *